US008587550B1

(12) United States Patent
Cselle et al.

(10) Patent No.: US 8,587,550 B1
(45) Date of Patent: *Nov. 19, 2013

(54) METHOD AND APPARATUS FOR LED TRANSITION FROM PHYSICAL TO VIRTUAL SPACE

(71) Applicant: Google Inc., Mountain View, CA (US)

(72) Inventors: Gabor Cselle, San Francisco, CA (US); Alexander Faaborg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/710,965

(22) Filed: Dec. 11, 2012

Related U.S. Application Data

(63) Continuation of application No. 13/474,844, filed on May 18, 2012, now Pat. No. 8,339,377.

(51) Int. Cl.
G06F 3/041 (2006.01)

(52) U.S. Cl.
USPC .......................................... 345/173; 715/863

(58) Field of Classification Search
USPC ............................ 345/173–184; 715/863–866
See application file for complete search history.

(56) References Cited

U.S. PATENT DOCUMENTS

| 8,265,383 | B2 | 9/2012 | Wu | |
|---|---|---|---|---|
| 2007/0250787 | A1* | 10/2007 | Kawahara et al. | 715/782 |
| 2008/0036575 | A1 | 2/2008 | Kim et al. | |
| 2010/0156656 | A1 | 6/2010 | Duarte et al. | |
| 2012/0060128 | A1 | 3/2012 | Miller et al. | |
| 2012/0102122 | A1 | 4/2012 | Byrnes | |

FOREIGN PATENT DOCUMENTS

EP 2306262 A1 6/2011

OTHER PUBLICATIONS

Pinstack.com/Forum/Smarthphone/Blackberry Smartphones/ Blackberry Apps and Downloads/ BeBuzz 4 How to (URL: http:forums.pinstack.com/f233/bebuzz_4_how_to-125640/), "BeBuzz 4 How to" posted by thbassman on Mar. 8, 2011.*
Video "Leave It On" posted by Shao128 on Mar. 25, 2011 in Crackberry.com/Forum/BlackBerry OS Phone Forums/ More BlackBerry Phones / BlackBerry Bold 9650 / Toasts (Forum URL: http://forums.crackberry.com/blackberry-bold-9650-f172/toasts-597600/, Video URL: http://www.youtube.com/watch?v=Yz5C6mRT7mE&feature=player_embedded, uploaded Aug. 19, 2010).*
AutoAssign: Easily Create Rules to Automatically Organize Email in your Outlook Inbox, ClearContext®, Oct. 2, 2012.
Leaked: BlackBerry Messenger 6.0 Features Color-Coded Contacts, Mobile Magazine, Oct. 2, 2012.
Who Is It—LED Light Alerts for Contacts App Review—T3 App Chart, Jiveworld12 Unstoppable Social Business Conference, Jul. 12, 2011.

(Continued)

Primary Examiner — Liliana Cerullo
(74) Attorney, Agent, or Firm — Shumaker & Sieffert, P.A.

(57) ABSTRACT

An electronic device comprising a touchscreen and a light element may be operable to illuminate the light element in response to an event. In response to an input from a user of the electronic device, the electronic device may display on the touchscreen an animation of a graphical representation of the light element moving onto the touchscreen to a target location on the touchscreen. The graphical representation of the light element may share one or more characteristics with the light element. The characteristic(s) may indicate a contact, application, and/or operating system associated with the event.

20 Claims, 5 Drawing Sheets

(56) References Cited

OTHER PUBLICATIONS

Color-Code Contacts by Category: MS Outlook, by Carol Bratt, Oct. 2, 2012.

"OL2000: How to Color-Code Contacts by Category," [online] Microsoft, Sep. 29, 2003. Retrieved from the Internet: <http://support.microsoft.com/kb/196739> 2 pgs.

Search Report from UK Intellectual Property Office for Application No. GB1308256.5, dated May 30, 2013, 4 pgs.

* cited by examiner

METHOD AND APPARATUS FOR LED TRANSITION FROM PHYSICAL TO VIRTUAL SPACE

PRIORITY CLAIM

This patent application is a continuation of U.S. patent application Ser. No. 13/474,844 filed on May 18, 2012, which is hereby incorporated herein by reference in its entirety.

TECHNICAL FIELD

Certain embodiments of the present method and apparatus relate to electronic devices. More specifically, certain embodiments relate to LED transitions from physical to virtual space.

BACKGROUND

User notifications on conventional electronic devices can be too user-intensive and consume too much power. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for LED transition from physical to virtual space, substantially as illustrated by and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "exemplary" means serving as a non-limiting example, instance, or illustration. As utilized herein, the term "e.g.," introduces a list of one or more non-limiting examples, instances, or illustrations.

Figure 1:
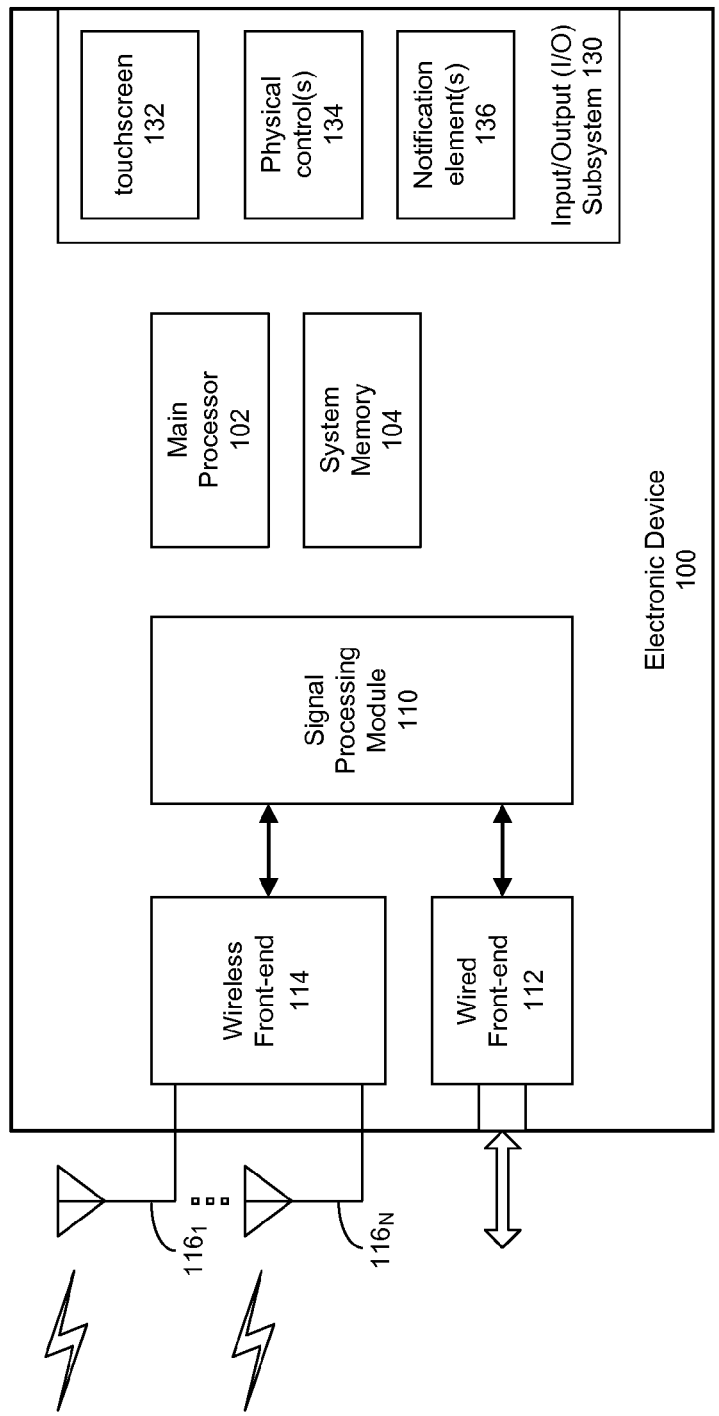
FIG. 1 a block diagram illustrating an electronic device that is operable to perform LED transitions from physical to virtual space, in accordance with an embodiment of the disclosure.

FIG. 1 a block diagram illustrating an electronic device that is operable to perform LED transitions from physical to virtual space, in accordance with an embodiment of the present method and/or apparatus. Referring to FIG. 1, there is shown an electronic device 100 comprising a main processing module 102, a system memory module 104, a signal processing module 110, a wired front-end (FE) module 112, a wireless front-end (FE) module 114, a plurality of antennas 116A-116N, and an input/output (I/O) subsystem 130. The electronic device 100 may be, for example, a mobile phone, a tablet, or a laptop computer.

The main processor module 102 may be operable to process data, and/or control and/or manage operations of the electronic device 100, and/or tasks and/or applications performed therein. In this regard, the main processor 102 may be operable to configure and/or control operations of various components and/or subsystems of the electronic device 100, by utilizing, for example, one or more control signals. The main processor 102 may enable execution of applications, programs and/or code, which may be, for example, stored in the system memory 104.

The system memory 104 may comprise suitable logic, circuitry, interfaces, and/or code that may enable volatile and/or non-volatile storage, buffering, and/or fetching of data, code and/or other information, which may be used, consumed, and/or processed. In this regard, the system memory 104 may comprise different memory technologies, including, for example, read-only memory (ROM), random access memory (RAM), Flash memory, solid-state drive (SSD), and/or field-programmable gate array (FPGA). The system memory 104 may store, for example, configuration data, program code, and/or run-time data.

The wired FE 112 may be operable to perform various functions for wireline communication over supported physical wired media in accordance with one or more wireline protocols (e.g. Ethernet and/or USB). Functions performed by the wired FE 112 may include, for example: amplification, frequency conversion, filtering, digital-to-analog conversion, and/or analog-to-digital conversion.

The wireless FE 114 may be operable to perform various functions for wirelessly communicating via the antennas 116A-116N in accordance with one or more wireless protocols (e.g., Wi-Fi and/or cellular). Functions performed by the wireless FE 114 may include, for example: amplification, frequency conversion, filtering, digital-to-analog conversion, and/or analog-to-digital conversion.

The signal-processing module 110 may be operable to process signals transmitted and/or received by the electronic device 100, in accordance with one or more wired or wireless protocols. The signal-processing module 110 may be operable to perform such signal processing operation as, for example, filtering, encoding/decoding, encryption/decryption, and/or modulation/demodulation.

The input/output (I/O) subsystem 130 may enable a user to interact with the electronic device 100. In this regard, the I/O subsystem 130 may support various types of inputs and/or outputs, including video, audio, and/or text. I/O devices and/or components, external or internal, may be utilized for inputting and/or outputting data during operations of the I/O subsystem 130. The I/O subsystem may comprise, for example, a touchscreen 132, one or more physical ("hard") controls 134, and one or more LEDs 136.

The touchscreen 132 may comprise, for example, a liquid crystal display capable of displaying graphical elements that a user can interact with by touching them with a finger or a stylus. The touchscreen 132 may be, for example, a resistive, capacitive, surface wave, or infrared touchscreen.

The control(s) 134 may comprise, for example, a multi-function switch or button. For example, holding down the button for a longer period of time may power the electronic device 100 on and off whereas short presses of the button may turn the touchscreen 132 on and off.

The LED(s) 136 may enable the device to visually alert a user of the electronic device 100 without turning on the touchscreen 132. For example, the LED(s) may comprise one or more light-emitting-diode (LED). In such an embodiment, the LED may comprise a plurality of LEDs of one or more colors and/or may comprise a multi-color LED.

In operation, the main processor 102, the system memory 104, and the I/O subsystem 130 may interoperate to interface with a user and to send and receive communications via the wired FE 112 and/or the wireless FE 114. For example, in response to an event (e.g., reception of a communication, input from a user, an alarm, and/or a change in status or condition of the electronic device 100 and/or one or more of its components), the main processor 102 may execute one or more lines of code stored in the memory 104, and generate data to be transmitted via the wireless FE 114 and/or presented to a user via the I/O subsystem 130. For example, receipt of an email, receipt of a voicemail, receipt of an SMS or MMS message, or occurrence of a calendar reminder, may trigger the processor 102 to execute code which implements an algorithm such as the ones described below with respect to FIGS. 2-5.

Figure 2:
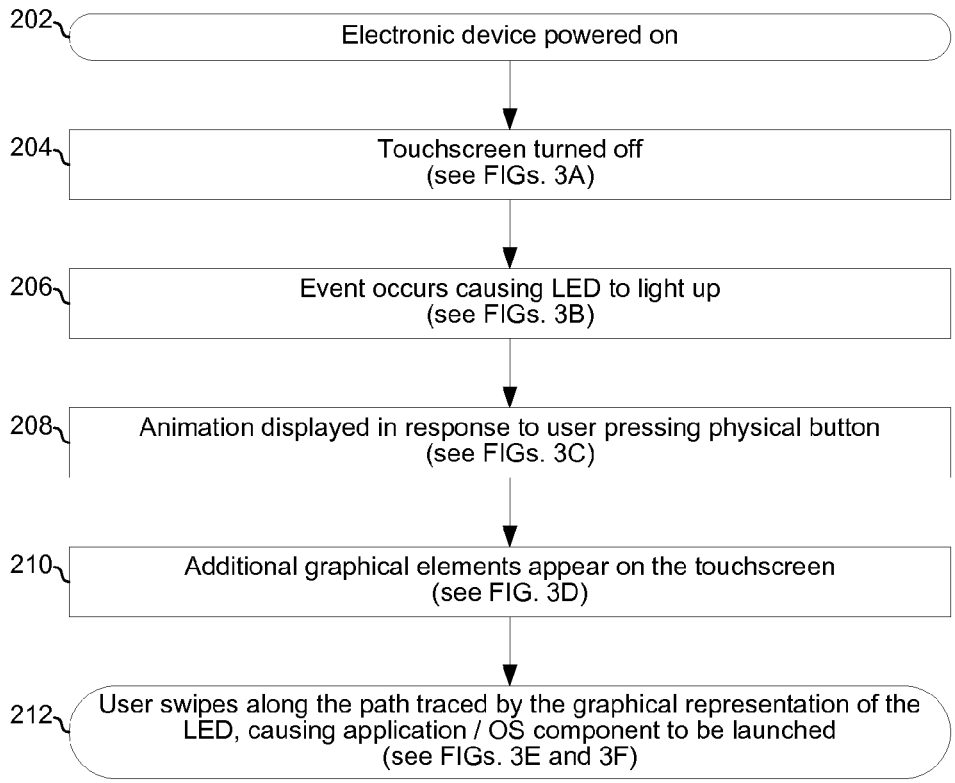
FIG. 2 is a flowchart illustrating exemplary steps performed by an electronic device transitioning an LED from physical to virtual space.

FIG. 2 is a flowchart illustrating exemplary steps performed by an electronic device transitioning an LED from physical to virtual space. The exemplary steps are described with reference to FIGS. 3A-3F. The steps begin with step 202 in which the electronic device 100 is powered on.

Figure 3A:
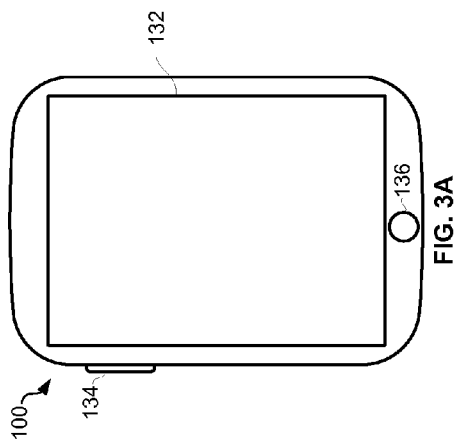
FIGS. 3A-3F depict various states of an electronic device that supports LED transitions from physical to virtual space.

In step 204, the touchscreen 132 is powered off. This may occur, for example, as a result of a timeout or a user pressing the button 134. Powering off the touchscreen may save power and/or prevent inadvertent input to the touchscreen (e.g., while the electronic device 100 is in the user's pocket). FIG. 3A depicts the device 100 with the touchscreen powered-off.

Figure 3B:
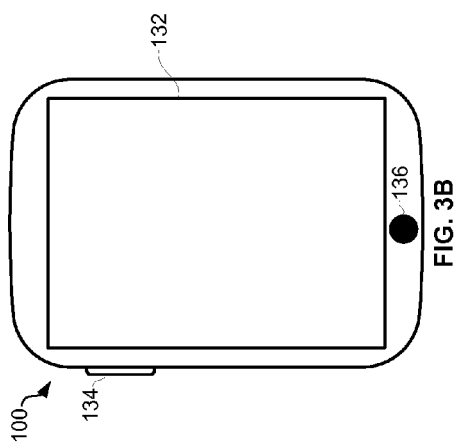

In step 206, an event occurs causing the LED to light up. This is depicted in FIG. 3B by the notification element 136 transitioning from white to black. The event may be, for example, a missed call, receipt of an email, receipt of a voicemail, receipt of an SMS or MMS message, or a calendar reminder. Illuminating the LED 136 may be a low-power way to notify the user of occurrence of the event as compared, for example, to turning on the touchscreen 132.

In one embodiment, characteristics of the illuminated LED may indicate a contact (e.g., name, phone number, and/or email address) and/or application (or operating system (OS) component) associated with the event. The characteristics may include, for example, color and/or intensity of the LED 136, and/or the frequency at which the LED 136 blinks. For example, a text message from J. Doe may cause the LED 136 to be steady red, a missed call from J. Doe may cause the LED to blink red, a text message from B. Smith may cause the LED 136 to be steady blue, and a missed call from B. Smith may cause the LED to blink blue.

The color associated with a particular contact may be assigned by the user and/or may be automatically assigned according to an algorithm implemented by the processor 102 (e.g., a contact may be assigned a colors based on frequency of events associated with that contact and/or user input such as a priority level of that contact). Where the colors are automatically assigned, repeated use of a particular color for a particular contact will enable the user to learn which color is associated with which contact. In this regard, the electronic device 100 may be operable to automatically analyze (e.g., via main processor 102) communications conducted via the electronic device 100, and may adaptively assign colors to contacts which may be determined to be most important to the user. The analysis and/or color-to-contact assignment may be based on a range of various parameters, which may comprise, for example, frequency of communication, known relationships, content of previous communications, and/or times of various communications.

Such adaptive and/or automatic analysis, the ability to learn the varying degree of importance of existing contacts, and/or assign color based thereon may be desirable since there is finite number of uniquely recognizable colors, and when users have a large number of contacts, it would optimal to that the most important contacts be assigned available colors at the expense of less important contacts. Transitioning the LED from physical to virtual space, as described below, will further solidify this association of color and contact in the user's mind. Accordingly, over time, a user will come to know which contact and/or application/OS component has triggered the event simply by looking at the characteristics of the LED 136.

Figure 3C:
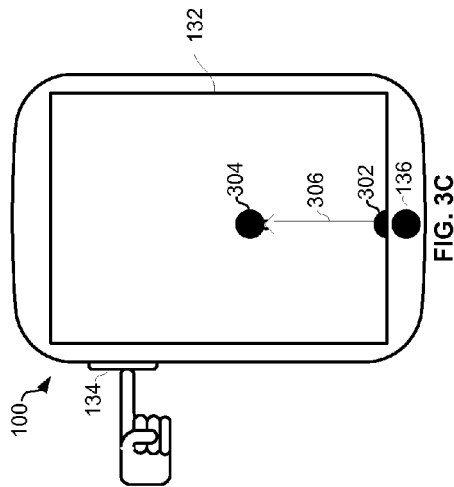
Figure 3D:
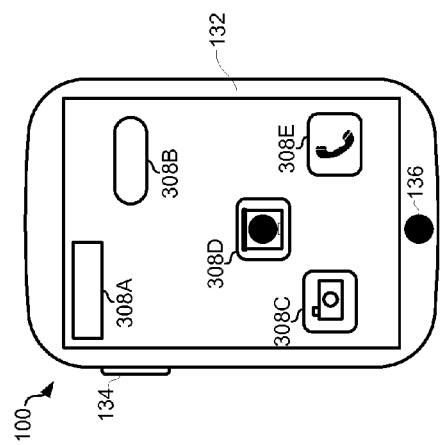

In step 208, the user presses the button 134 in response to seeing the illuminated LED 136. In response, the processor 102 may execute code stored in the memory 104 which causes the touchscreen 132 to display an animation of a graphical representation of the LED 136 moving onto the touchscreen 132 and to a target location. The target location 304 may be determined based, for example, on a contact associated with the event, an application and/or OS component associated with the event, user preferences, a number of notifications pending, and/or other suitable considerations. This is depicted in FIG. 3C which shows a graphical representation of the LED moving onto the touchscreen at location 302 and moving to target location 304, as represented by the arrow 306. The physical LED 136 may stay illuminated as the graphical representation of it moves across the touchscreen or may turn off as the graphical representation of the LED moves onto the touchscreen ("i.e. enters from the edge of the touchscreen") to give a visual impression that the LED has physically moved to the target location 304. Accordingly, the graphical representation of the LED may have characteristics (e.g., size, shape, and color) of the LED 136. The graphical representation may also take on different characteristics. For example, during and/or after moving to the target location 304, the graphical representation of the LED may change characteristics such as size, shape, color, intensity, etc. In one embodiment, a device may comprise a plurality of screens, and the animation may be displayed on one or more of the screens. For example, the graphical representation of the LED may traverse a first screen in traveling to a target point on a second screen.

In step 210, other graphical elements may appear (e.g., fade in) on the touchscreen 132. Thus, in this embodiment, no other graphical elements may be displayed on the touchscreen 132 while the animation is in progress (i.e., the rest of the screen may remain black during the animation). In another embodiment, the other graphical elements may appear (perhaps dimly) before the animation, and the animation may then be overlaid onto the displayed graphical elements. These graphical elements could include icons that launch applications/OS components, informational elements (e.g., "gadgets"), status indicators, etc.

In one embodiment, the target location 304 may coincide with one of these graphical elements (e.g., an application icon) that a user may interact with via a finger or stylus gesture. For example, the icon which coincides with the target location 304 may be selected (and the corresponding application/OS component launched) by swiping along the path that was traced by the graphical representation of the LED. That is, the animation provides a graphical cue of the input that the user should provide in order to act upon the notification (e.g. to obtain further details about the event that caused the LED 136 to light up).

Figure 3E:
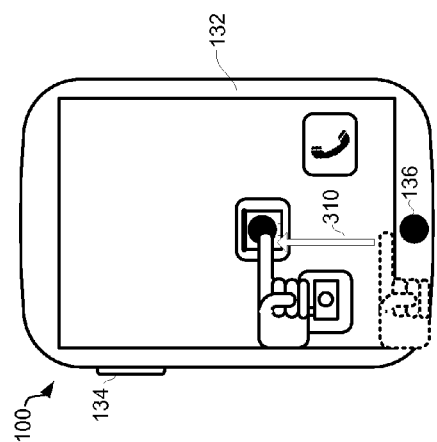
Figure 3F:
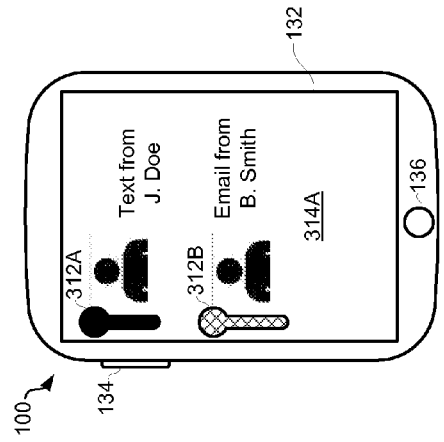

Thus, in step 212 when the user swipes (as indicated by arrow 310) along the path traced by the graphical representation of the LED (as shown in FIG. 3E), the electronic device launches the notifications management application (which could be, for example, an application or OS component) (screenshot 314A of the notifications management application is shown in FIG. 3F). In one embodiment, the notifications management application/OS component displays graphical elements 312 next to contacts associated with pending notifications. These graphical elements may be color coded to indicate the color associated with that contact. That is, the graphical element 312A indicates a color associated with J. Doe and the graphical element 312B indicates a color associated with B. Smith. Thus, the color of the LED will be the color of the graphical element 312A when J. Doe is associated with the event that triggered the LED to light up, and the color of the LED will be the color of the graphical element 312B when B. Smith is associated with the event that triggered the LED to light-up.

Although FIG. 2 depicts launching a notifications management application/component in response to the user tracing the path followed by the graphical representation of the LED, other applications could alternatively or additionally be launched. For example, if the notification was generated as the result of a received voicemail, a voicemail application or OS component may be launched. Furthermore, which application and/or OS components launches in response to the user input may depend on the number and/or type of notifications pending. An example would be as follows. If the only notifications associated with a single application or OS component (e.g., email) are pending, inputting the gesture indicated by the animation may launch that application or OS component. If notifications of more than one type are pending (e.g., an email and a voicemail) then inputting the gesture indicated by the animation may launch the notifications management application or OS component.

Additionally or alternatively, which application and/or OS component launches may depend on when the user responds to the notification. In such an implementation, the touchscreen 132 may power on, and the animation may be displayed, upon the event occurring. The touchscreen 132 may then turn off after a timeout. The animation may not be displayed again until after the user presses the button 134. If the user traces the animation path before the timeout a first application and/or OS component may be launched. If the timeout occurs, however, and the user then presses the button 134 to view the animation, a different application and/or OS component may be launched. For example, the event may be receipt of a text message. If the user input occurs before the timeout, the text messaging application may be launched. If the timeout occurs, however, and the animation is replayed in response a press of button 134, then the user input may cause the notifications management application/component to launch.

Figure 4:
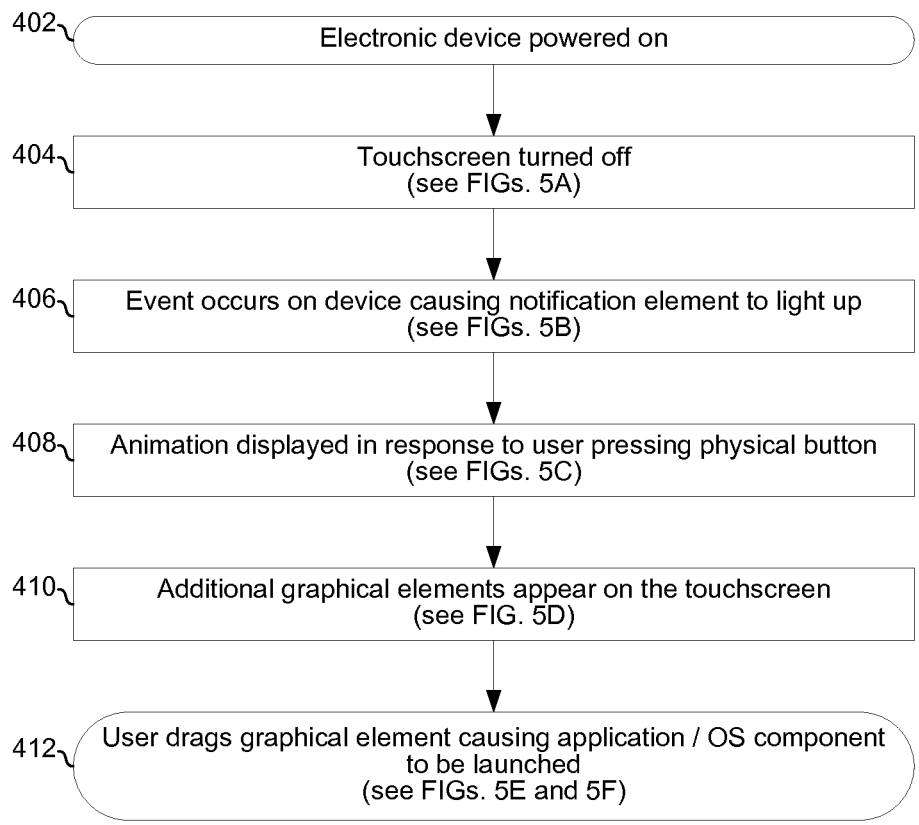
FIG. 4 is a flowchart illustrating exemplary steps performed by an electronic device transitioning an LED from physical to virtual space.

FIG. 4 is a flowchart illustrating exemplary steps performed by an electronic device transitioning an LED from physical to virtual space. The exemplary steps are described with reference to FIGS. 5A-5F.

Figure 5A:
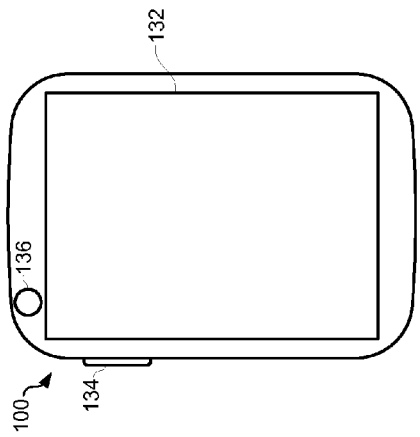
FIGS. 5A-5F depict various states of an electronic device that supports LED transitions from physical to virtual space.
Figure 5B:
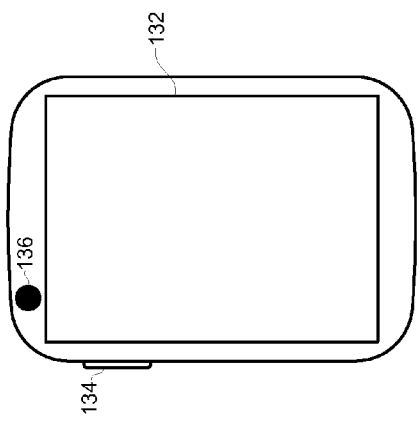
Figure 5C:
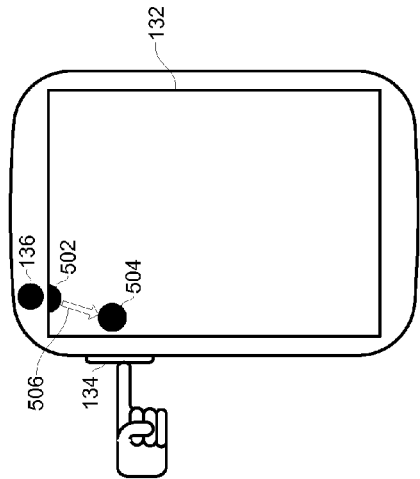

The steps 402-410 are substantially similar to the steps 202-210, and similarly begin with step 402 in which the electronic device 100 is powered on. The corresponding FIGS. 5A-5D, however, depict an electronic device which has its LED 136 at the top left, rather than bottom center of the touchscreen 132. Accordingly, in step 408, when the user presses the button 134 in response to seeing the illuminated LED 136, the processor 102 may similarly execute code stored in the memory 104 which causes the touchscreen 132 to display an animation of a graphical representation of the LED 136 moving onto the touchscreen 132 and to a target location, as depicted by FIG. 5C. However, as opposed to the embodiment in FIG. 3C where the graphical representation moved onto the screen from the location 302 at the bottom center edge of the touchscreen 132, in FIG. 5C the LED 136 moves onto the touchscreen 136 from location 502 at the top left edge of the touchscreen 132. FIG. 5C also differs in that the target location 504 differs from the target location 304. FIGS. 3C and 5C provide just two examples of paths traversed by the graphical representation of the LED. In practice, the graphical representation of the LED could move from a LED at any physical location to any target location on the touchscreen 132. The location of the LED on any particular device may be configured via, for example, an application programming interface (API). The location may be specified, for example, in screen pixel coordinates.

Figure 5D:
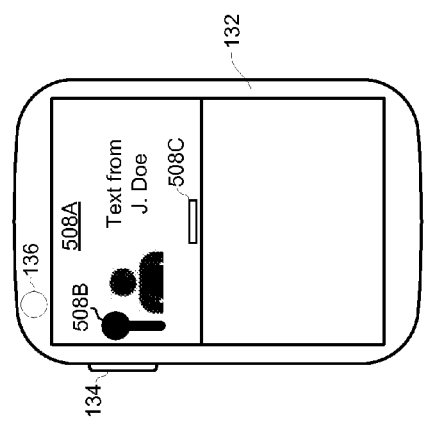
Figure 5E:
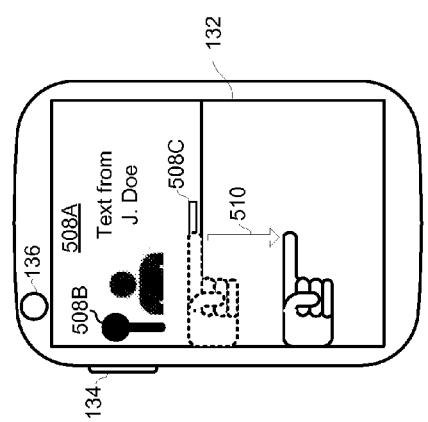

FIG. 5D differs from FIG. 5C in that the graphic element 508A shown in FIG. 5D comprises information about the event that caused the LED to light up. The graphical element 508A comprises a graphical element 508B which is substantially similar to the graphical elements 312A and 312B described with respect to FIG. 3F. The graphical element 508A also comprises a graphical element 508C which a user may interact with to launch the notifications management application.

Figure 5F:
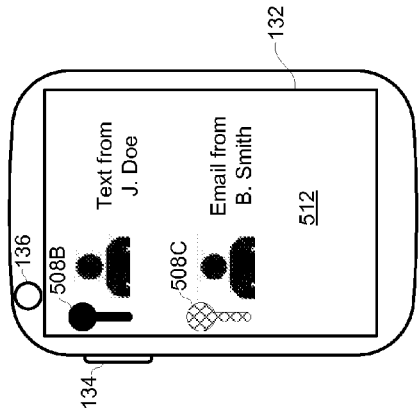

Thus, in step 412, the user drags down the graphical element 508C (as indicated by arrow 510) to launch the notifications management application. In some instances, the user may also just interact directly with the application creating the notification, such as by responding to a text message, for example. Screenshot 512 of the notifications management application/OS component is shown in FIG. 5F and is substantially similar to the screenshot 314A described with respect to FIG. 3F.

In accordance with various aspects of the present disclosure, an electronic device 100 comprising a touchscreen 132 and a light emitting diode (LED) 136 may be operable to illuminate the LED 136 in response to an event occurring on the electronic device 100. The electronic device 100 may be operable to display an animation of a graphical representation of the LED (e.g., representation 302 or 502) moving onto the touchscreen 132 to a target location (e.g., location 304 or 504) on the touchscreen 132. The electronic device 100 may be operable to detect an input from a user at or proximate (e.g., within a threshold number of pixels or threshold number of touch sensors) to the target location. In response to the detection of the input from the user, the electronic device 100 may be operable to display information pertaining to the event. One or more characteristics of the graphical representation of the LED may indicate a contact associated with the event.

Examples of such characteristics of the graphical representation of the LED comprise: color of the graphical representation of the LED, size of the graphical representation of the LED, and shape of the graphical representation of the LED.

In accordance with various aspects of the present method and apparatus, an electronic device 100 comprising a touchscreen 132 and a light emitting diode (LED) 136 may be operable to illuminate the LED 136 in response to an event occurring on the electronic device 100. In response to an input from a user of the electronic device 100, the electronic device 100 may display on the touchscreen 132 an animation of a graphical representation of the LED moving onto the touchscreen 132 to a target location on the touchscreen 132. During the animation, the graphical representation of the LED may be the only thing displayed on the touchscreen. The electronic device 100 may, subsequent to the animation, display additional graphical elements (e.g., graphic elements 308A-308E) on the touchscreen 132 while continuing to display the graphical representation of the LED at the target location.

The electronic device may, subsequent to the animation, display a graphical element (e.g., 508C) on the touchscreen 132 that, when dragged by a user, brings up an application or OS component on the touchscreen 132. The application or OS component may be a notifications management application/component. The target location may be next to an avatar of a contact stored on the electronic device. A path traversed by the graphical representation of the LED during the animation may corresponds to a touchscreen gesture that, when performed by a user of the electronic device, brings up an application or OS component (e.g., notifications management application/component) on the touchscreen. The graphical representation of the LED may be the same color as the LED. A color of the LED may correspond to a contact stored on the phone that is associated with the event.

Other embodiments of the present method and apparatus may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for LED Transition From Physical to Virtual Space.

Accordingly, the present method and apparatus may be realized in hardware, software, or a combination of hardware and software. The present method and apparatus may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and apparatus may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and apparatus has been described with reference to certain embodiments, it will be understood by those skilled in the art that various changes may be made and equivalents may be substituted without departing from the scope of the present method and apparatus. In addition, many modifications may be made to adapt a particular situation or material to the teachings of the present disclosure without departing from its scope. Therefore, it is intended that the present method and apparatus not be limited to the particular embodiment disclosed, but that the present method and apparatus will include all embodiments falling within the scope of the appended claims.

What is claimed is:

1. A method comprising:
performing, by an electronic device:
illuminating, in response to an event, a light element located outside of a screen of the electronic device; and
displaying, at the screen of the electronic device, an animation of a graphical representation of the light element in which the graphical representation of the light element appears to enter the screen from an edge of the screen at a location proximate the light element and move to a target location on the screen to provide a visual indication that the light element has physically moved towards the target location, wherein a shape, size, and characteristic of the graphical representation of the light element is substantially similar to a shape, size, and same characteristic of the light element.

2. The method of claim 1, comprising displaying information pertaining to the event in response to detecting a user input at or proximate the target location.

3. The method of claim 1, wherein the characteristic is color.

4. The method of claim 1, wherein:
the characteristic indicates a contact associated with the event; and
the characteristic is automatically associated with the contact based on an importance of the contact.

5. The method of claim 1, wherein:
the characteristic indicates a contact associated with the event; and
the characteristic is automatically assigned to the contact based on one or more of:
a user-assigned priority level associated with the contact;
a frequency at which events associated with the contact occur;
content of a previous communication with the contact; and
time of a previous communication with the contact.

6. The method of claim 1, wherein:
the characteristic indicates an application associated with the event; and
the characteristic is automatically assigned to the application based on one or more of:
a user-assigned priority level associated with the application;
a frequency at which events associated with the application occur; and
time of a previous event associated with the application.

7. The method of claim 1, wherein:
the characteristic indicates an operating system component associated with the event; and the characteristic is automatically assigned to the operating system component based on one or more of:
a user-assigned priority level associated with the operating system component;
a frequency at which events associated with the operating system component occur; and
time of a previous event associated with the operating system component.

8. The method of claim 1, wherein the event is one of:
receipt of a communication;
input from a user;
an alarm; and
a change in status of the electronic device.

9. An electronic device, the electronic device comprising:
a screen;
a light element located outside the screen;
one or more processors; and
processor-readable instructions that, when executed by the one or more processors, cause the electronic device to:
illuminate, in response to an event, the light element; and
display, at the screen of the electronic device, an animation of a graphical representation of the light element in which the graphical representation of the light element appears to enter the screen from an edge of the screen at a location proximate the light element and move to a target location on the screen to provide a visual indication that the light element has physically moved towards the target location, wherein shape, size, and characteristic of the graphical representation of the light element is substantially similar to a shape, size, and same characteristic of the light element.

10. The electronic device of claim 9, wherein the processor-readable instructions, when executed, cause the electronic device to:
display information pertaining to the event in response to a detection of user input at or proximate the target location.

11. The electronic device of claim 9, wherein the characteristic is color.

12. The electronic device of claim 9, wherein:
the characteristic indicates a contact associated with the event; and
the characteristic is automatically associated with the contact based on an importance of the contact.

13. The electronic device of claim 9, wherein:
the characteristic indicates a contact associated with the event; and
the characteristic is automatically assigned to the contact based on one or more of:
a user-assigned priority level associated with the contact;
a frequency at which events associated with the contact occur;
content of a previous communication with the contact; and
time of a previous communication with the contact.

14. The electronic device of claim 9, wherein:
the characteristic indicates an application associated with the event; and
the characteristic is automatically assigned to the application based on one or more of:
a user-assigned priority level associated with the application;
a frequency at which events associated with the application occur; and
time of a previous event associated with the application.

15. The electronic device of claim 9, wherein:
the characteristic indicates an operating system component associated with the event; and
the characteristic is automatically assigned to the operating system component based on one or more of:
a user-assigned priority level associated with the operating system component;
a frequency at which events associated with the operating system component occur; and
time of a previous event associated with the operating system component.

16. The electronic device of claim 9, wherein the event is one of:
receipt of a communication;
input from a user;
an alarm; and
a change in status of the electronic device.

17. The electronic device of claim 9, wherein the characteristic is color and the color indicates a contact associated with the event.

18. A non-transitory machine-readable storage having stored thereon, at least one code section executable by an electronic device comprising a touchscreen and a light element located outside the touchscreen for causing the electronic device to perform operations that include:
illuminating, in response to an event, a light element located outside of a screen of the electronic device; and
displaying, at the screen of the electronic device, an animation of a graphical representation of the light element in which the graphical representation of the light element appears to enter the screen from an edge of the screen at a location proximate the light element and move to a target location on the screen to provide a visual indication that the light element has physically moved towards the target location, wherein a shape, size, and characteristic of the graphical representation of the light element is substantially similar to a shape, size, and same characteristic of the light element.

19. The non-transitory machine-readable storage of claim 18, wherein the operations include:
displaying information pertaining to the event in response to a detection of user input at or proximate the target location.

20. The non-transitory machine-readable storage of claim 18, wherein the characteristic is color.

* * * * *